Dec. 1, 1931.  W. E. WINANS  1,834,815
MOUNTING FOR THE TOOTH REST OF CUTTER GRINDERS
Filed March 17, 1930
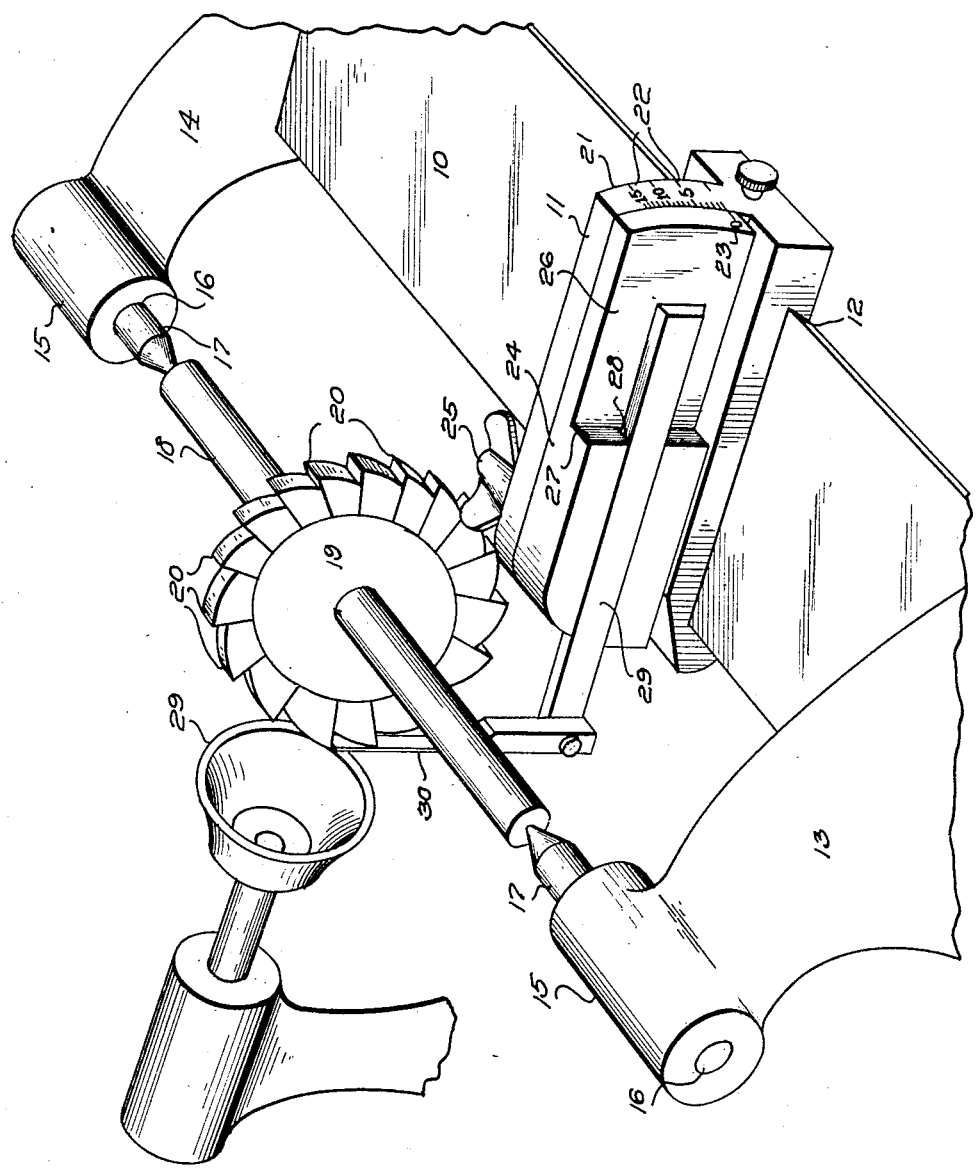
INVENTOR.
WILLIAM E. WINANS,
BY
ATTORNEY.

Patented Dec. 1, 1931

1,834,815

UNITED STATES PATENT OFFICE

WILLIAM E. WINANS, OF HARRISBURG, PENNSYLVANIA

MOUNTING FOR THE TOOTH REST OF CUTTER GRINDERS

Application filed March 17, 1930. Serial No. 436,450.

The invention is for an improved mounting for that part of tool and cutter grinders known as the tooth rest and is more applicable to a tool grinder when the grinding of a milling cutter reamer or the like is to be accomplished by the use of a cup wheel or flared cup wheel, although it may also be used advantageously with a disc wheel, using the periphery thereof for the grinding operation.

In devices of this kind as at present constructed, it is a tedious and time consuming operation to so adjust a tool with relation to the grinding element as to give the desired clearance angle to the cutting edge of the tooth of the tool being ground, it being necessary for the workman to first consult a clearance table which is usually provided by the manufacturer of the tool grinder being used, to determine the adjustment of the tooth rest with relation to the axis of the arbor on which the tool is mounted for grinding. This adjustment varies with the diameter of the tool and the clearance angle desired and is usually expressed in the clearance table in decimals of an inch, which the workman must translate into such fractional elements of an inch as may be readily measured with a machinist's-rule or scale, then by scale measurement he must adjust the tooth rest with relation to the axis of the arbor in such manner as to properly position the work with relation to the grinding element to give the desired clearance. Not only is this mode of procedure time consuming and tedious, but is fraught with the danger of damage to a tool resulting from mal-adjustment of the tool with relation to the grinding element when being ground.

The primary object of the invention is to provide a tooth rest having a calibration in degrees of angularity on the base thereof by which the rest for the tooth of a tool may be definitely and accurately adjsted in such manner as to give any desired clearance to the cutting edge of the tooth of a milling cutter reamer or the like by the rocking of the tooth rest arm on its pivotal connection with the calibrated portion of the tooth rest base, thereby obviating the necessity for reference to the clearance table and rule measurements and adjustments to conform to the designated clearance given in the clearance table.

It is a further object of the invention to provide a device of the character indicated having degrees of angularity calibrated thereon which will indicate the angle of clearance which will be imparted to the cutting edge of the tooth of a tool when the tooth rest arm is moved into registration with the desired degree of angularity of clearance which it is desired to impart to the tooth of the tool being ground.

In the accompanying drawing the device is illustrated in a perspective view, the supporting frame therefor being omitted as the invention is directed to the tooth rest and its mounting only.

The invention will be hereinafter fully set forth and particularly pointed out in the claims.

In the drawing, reference character 10 indicates the platen of the tool grinder which may be of any of the usual or standard types. The tooth rest supporting base 11 which is dovetailed as at 12 for receiving therein the inwardly beveled edges of the platen is adapted to have a longitudinal sliding movement with relation to the platen 10 for the adjustment of the base longitudinally on the platen for meeting the requirements of the specific tool to be ground and head stock 13 and tail stock 14 which are bored through their heads 15 as at 16 to receive centers 17 for supporting arbor 18 are all of the usual construction.

For the purpose of illustration, a milling cutter 19 having teeth 20 is shown as mounted on the arbor 18.

Supporting base 11 is provided with an arcuate end 21 upon which is calibrated in degrees of angularity as at 22 for setting the tooth rest at the desired angle. The tooth rest supporting member 24 is pivotally related to supporting base 11 by tension screw 25 and is provided with a cut away portion 26 for a portion of its length at the rear end thereof forming shoulder 27 having a dovetailed slot 28 extending therethrough for slidably receiving the tooth rest supporting arm 29 for outward and inward adjustment of the tooth rest finger per se 30 for accommodating the tooth rest finger to the requirements of tools of varying diameters.

When the supporting base 11 is positioned on the platen 10 and the tooth rest arm supporting member 24 is rocked about its pivot into zero or normal position, as shown in the drawing, the tooth rest arm 29 will be in exact parallelism with the horizontal plane of the platen 10 and with a longitudinal plane passing through the axis of the grinding wheel spindle and the supporting end of the tooth rest finger 30 will lie in the same horizontal plane as the axis of the tool supporting arbor 18, from which position the tooth rest finger 30 may be adjusted upwardly or downwardly with relation to the calibration of degrees of angularity 22 upon the supporting base 11. Thus at a glance, the operator may determine the exact degree of angularity at which the cutting edge of the tooth of the tool will contact with the grinding element for grinding the tool.

From the foregoing description it will be readily seen that when the device is once set for grinding the tooth of a tool, of a given diameter, at a given degree of angularity, that tools of other and varying diameters may be ground at the same degree of angularity by merely moving the tooth rest supporting arm 29 inwardly or outwardly of the dovetailed slot 28 of the tooth rest supporting member 24 for the reason that at any adjustment inwardly or outwardly, of supporting arm 29 the distance the tooth rest is moved below the work center will necessarily be equal to the sine of the desired angle multiplied by the radius of the tool to which it is adjusted and will be the exact amount in inches or decimals thereof, stipulated in the reference table for that particular angle of clearance and that particular diameter of tool.

It is essential that the axis of the tension screw 25 lie in the vertical plane passing longitudinally through the axis of the arbor 18 and that said plane be perpendicular to platen 10 and also to the spindle of the grinding element, thereby preserving the accuracy of the clearance imparted to the tooth of the tool being ground as indicated by the degree of angularity indicated by the zero mark 23 with the angularity degree 22 on the base 21 of the supporting element 11 by the rotation of the pivotal element 24 about the axis of tension screw 25.

While in the drawing, what is known as a flared cup grinding wheel, is shown, it is to be understood that the device is susceptible to the use therewith of either a cup grinding wheel or a disc wheel.

Having thus explained the nature of the invention and described an operative manner of constructing and using the same, although without attempting to set forth all the forms in which it may be made, or all the forms of its use, what is claimed is:—

1. A tooth rest mounting comprising a base having an arcuate end, calibrations of degrees of angularity inscribed on the arcuate end, a tooth rest arm supporting member pivotally related to the base, said member having an arcuate end coinciding with the arcuate end of the base for calibration registration therewith, said supporting arm being adjustable transversely of the platen and a tooth rest finger carried by the end of the arm.

2. A tooth rest mounting comprising a platen, an arbor supported by the platen, a tooth rest supporting member pivotally related to the platen, the axis of the pivot being in a vertical plane passing through the longitudinal axis of the arbor.

3. A tooth rest mounting comprising a platen, an arbor spaced from and parallel to the platen, a tooth rest supporting member pivotally related to the platen, the axis of the pivot being in a vertical plane passing through the longitudinal axis of the arbor.

4. A tooth rest mounting comprising a platen, an arbor supported by the platen, a tooth rest supporting member pivotally related to the platen, the axis of the pivot being in a vertical plane passing through the longitudinal axis of the arbor and perpendicular to the platen.

5. A tool grinder having a platen, an arbor supported by the platen, a rotatable grinder spaced from the arbor, a tooth rest supporting member pivotally related to the platen, the axis of the pivot being in a vertical plane passing through the longitudinal axis of the arbor, the longitudinal axis of the arbor and the axis of the grinder lying in the same horizontal plane.

6. A tooth rest mounting comprising a platen, an arbor supported by and parallel to the platen, a tooth rest supporting member pivotally related to the platen and transversely thereof, the longitudinal axes of the pivot of the supporting member and the arbor lying in a vertical plane passing through the axes thereof.

7. A tooth rest mounting comprising a platen, a base having a slot therein and pivotally mounted transversely of the platen, and a tooth rest slidable in the slot.

8. A tooth rest mounting comprising a platen, a base slidable longitudinally of the platen, a tooth rest supporting member having a slot therethrough pivotally related to the base, an arm slidable in the slot and a tooth rest finger affixed to the arm.

9. A tooth rest mounting comprising a platen, spaced apart stocks supported by the platen, an arbor rotatably mounted between the stocks, a base slidably carried by the platen, a slotted tooth rest arm supporting member pivotally related to the base, said member and said base having coinciding arcuate ends with degrees of angularity thereon, an arm within the slot and slidable transversely of the platen and a tooth rest finger carried by the arm.

10. A tooth rest mounting comprising a platen, spaced apart stocks supported by the platen, an arbor rotatably mounted between the stocks, a base slidably carried by the platen, a slotted tooth rest arm supporting member pivotally related to the base, said member and said base having coinciding arcuate ends with degrees of angularity thereon, an arm within the slot and slidable transversely of the platen, a tooth rest finger carried by the arm and means for securing the supporting member against movement with relation to the base.

In testimony whereof I have hereunto set my hand.

WILLIAM E. WINANS.